United States Patent [19]

Macken

[11] 4,242,646
[45] Dec. 30, 1980

[54] SPIRAL FLOW CONVECTIVE LASER

[76] Inventor: John A. Macken, P.O. Box 696, Santa Rosa, Calif. 95402

[21] Appl. No.: 905,186

[22] Filed: May 12, 1978

[51] Int. Cl.³ .................... H01S 3/02; H01S 3/045
[52] U.S. Cl. .................... 331/94.5 D; 331/94.5 G; 331/94.5 P
[58] Field of Search ............ 331/94.5 G, 94.5 D, 331/94.5 P, 94.5 PE

[56] References Cited
U.S. PATENT DOCUMENTS

| | | | |
|---|---|---|---|
| 3,671,883 | 6/1972 | Smars | 331/94.5 G |
| 3,978,430 | 8/1976 | Pierce et al. | 331/94.5 D |

*Primary Examiner*—James W. Davie
*Attorney, Agent, or Firm*—Edward E. Roberts

[57] ABSTRACT

This invention relates to a method and apparatus for making high-powered lasers. More particularly, this invention relates to a method and apparatus for utilizing a spiral cooling fin design to achieve convective gas transport in a laser such as a $CO_2$ laser.

8 Claims, 3 Drawing Figures

SPIRAL FLOW CONVECTIVE LASER

BACKGROUND

1. Field of the Invention

This invention relates to gas lasers in general, and to an improved gas laser with improved cooling apparatus, in particular.

2. Prior Art

There are several known designs according to which gas lasers such as the carbon dioxide laser can be constructed. In each of these designs an electrical discharge is passed through a static gas in a "gas discharge tube". The simplest and lowest power approach utilizes a water-cooled gas discharge tube. That is, a jacket for flowing water is placed at the gas discharge tube to provide temperature control. This approach is currently used in the vast majority of commercial $CO_2$ lasers sold today. However, this approach has an output power limitation. This power limitation arises because the gas temperature in a $CO_2$ laser cannot exceed approximately 300° C. without detrimental effects. Because the electrical discharge is continuously heating the gas, there is a maximum input power per unit length which is determined by the thermal conductivity of the gas. This maximum input power is about 350 watts per meter of discharge length, thereby producing a maximum output beam power of approximately 70 watts per meter of length.

Another approach to the construction of $CO_2$ lasers is generally called the convective flow lasers. In this approach, gas is circulated through an electrical discharge region where the electrical discharge excites the molecules thereby producing laser action. The gas is then flowed to a cooling section where the waste heat is removed from the gas. The convective flow lasers do not have any specific limitation as to the output power per unit length, inasmuch as this is dependent on variables such as the gas flow speed, gas pressure, and the like.

Other laser designs such as gas dynamic lasers and the like will not be discussed further, because they do not have application to the present design.

The gas discharge tube laser design has the advantages that the long, narrow discharge geometry allows good laser beam quality ($TEM_{00}$ modes) and the gas can be flowed through the laser discharge region at a slow flow rate. However, the major disadvantage of the discharge tube design is its power limitation.

The convective flow lasers have no specific power limitation, but they have the disadvantages that the electrical discharges can go unstable and cause the laser to be sufficiently unreliable that it is undesirable for many industrial applications, the geometry of the discharge region dictated by the conventional flow laser designs is not conducive to producing good laser beam mode quality, and vast quantities of gas have to be pumped by high-speed and expensive pumps.

PRIOR ART STATEMENT

A search of the art has not been conducted. However, the most pertinent prior art designs are described hereinabove.

DESCRIPTION OF A PREFERRED EMBODIMENT

Figure 1:
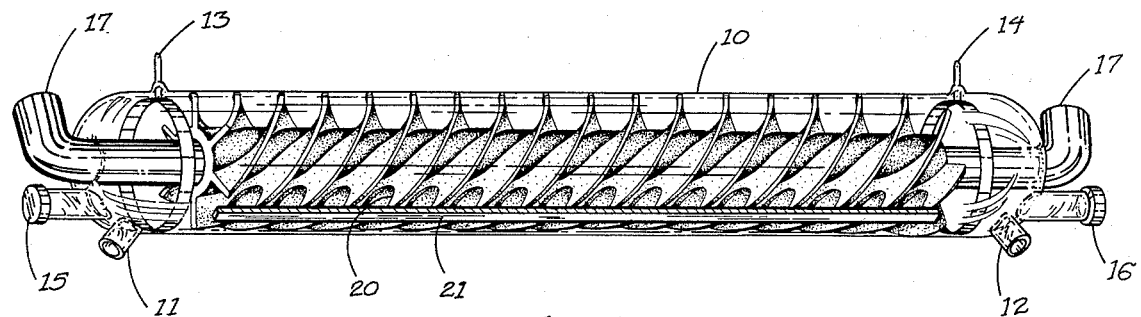
FIG. 1 is a perspective view of a spiral flow convective laser in accordance with this invention.

Referring now to the drawings in detail, FIG. 1 shows that the essential features of the laser are housed within external tube 10 which can be made of glass or other electrically non-conductive material. This tube is equipped with a gas inlet port 11, and a gas outlet port 12. There are also two or more electrodes 13 and 14. Each of the electrodes are shown as a metal ring connected to a metal rod which extends through glass tube 10. However, other well-known electrode shapes can be used. Laser mirrors 15 and 16 are located at opposite ends of the laser apparatus. Mirror 15 is a semi-transparent reflector and mirror 16 is a total reflector as is typical in laser construction. Tube 17 which is made from an electrically non-conducting material such as glass or alumina, runs down the long axis of the external glass tube 10. Water or other cooling fluid is passed through tube 17 to provide cooling to the spiral fins which surround this tube in the central region of the laser. For purposes of this illustration, it can be presumed that the cooling fluid enters from the end of tube 17 closest to mirror 15, and exits from the other end of tube 17 closest to mirror 16. The fluid is provided by any suitable system, which is not shown.

A plurality of spiral shaped metal segments 18 is provided to form a fin assembly. Each metal fin segment 18 is electrically insulated from adjoining segments. These segments are formed in such a way that gas entering the laser from port 11 will tend to flow in a spiral or helical path defined by fin segments 18 around the central cooling tube 17 as the gas flows towards exit port 12. The helical shaped segments 18 have holes 20 cut through the helical fins such that there is an unobscured optical path between mirrors 15 and 16. The laser beam and the electrical discharge passes through this series of holes 20. A permanent magnet 21 is placed adjacent the series of holes 20 in segments 18 to stabilize the electrical discharge through tube 10.

Figures 2, 3:
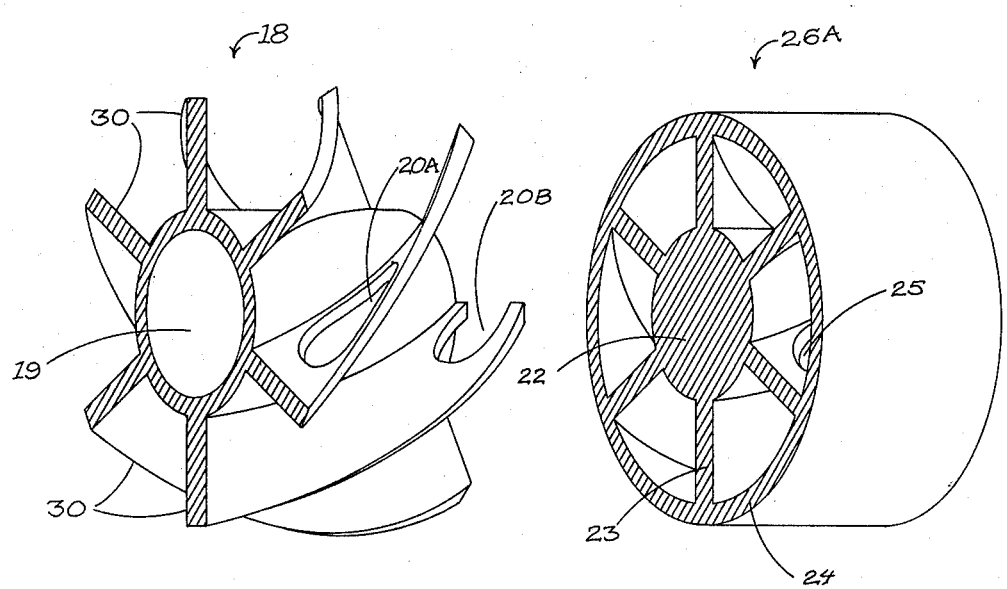
FIG. 2 is a fin segment of a spiral flow laser utilizing center cooling.
FIG. 3 is a fin segment of a spiral flow laser using peripheral cooling.

FIG. 2 shows one of the fin segments 18 which makes up the complete fin assembly shown in FIG. 1. Each fin segment consists of a multiplicity of spiral fins 30 (six are shown in FIG. 2) surrounding a central bore 19. A series of holes 20A, 20B, etc., are cut through the fin 30 sections to provide a straight path for the laser beam and electrical discharge when the spiral fins 30 are assembled as a fin assembly. It is understood that there can be a plurality of holes 20 in each of the spiral fins 30. Short segment are used to establish electrical isolation as will be explained later. A preferred material for these fin segments is anodized aluminum, but any material with good thermal conductivity can be used as long as there is no low resistance electrical path through the assembled fins.

A laser which was constructed using this design, had a length of 7 feet between electrodes 13 and 14. Tube 10 was 3 inches inner diameter, and the fin segments were 1½ inches long, 2.9 inches outer diameter, and constructed of anodized aluminum. Bore 19 in fin segment 18 was one inch in diameter, and tube 17 was 0.98 inch diameter. The cylindrical area around hole 19 was 1.25 inches in diameter. There were six helical fins (as shown in FIG. 2) with a pitch such that each fin made one revolution for every six inches of length. Holes 20 were 0.75 inches in diameter. In operation, a hose was connected to tube 11. A regulated supply of $CO_2$, $N_2$ and He (not shown) was fed through the hose and entered the laser at tube 11. Meanwhile, a vacuum pump (also not shown) was extracting this gas through a tube connected to port 12. While the laser gas was used once and exhaused, techniques known in the art could be used to recirculate the laser gas.

The laser gas was a mixture of carbon dioxide, nitrogen and helium at a total pressure of about 20 torr. The vacuum pump extracted the gas at a rate of about 3000 liters per minute. Experiments indicated that for the above conditions, approximately 90% of the gas followed the counter-clockwise rotation through the spiral fin assembly. Approximately 10% of the gas passed through the holes 20, thus introducing a relatively small leakage to the otherwise perfect helical flow pattern. Tap water (from a source not shown) was introduced into tube 17 at one end and discharged from the other end of tube 17. The flow rate of water was approximately 5 gallons per minute. The heat from the fin segments was conducted to the cooling water utilizing the thermal conductivity of the laser gas to bridge the small gap between bore 19 and tube 17. An electrical discharge was established between electrodes 13 and 14 by applying high voltage differential between these two electrodes from an external DC power supply (not shown).

At the above conditions, approximately 33,000 volts were required to establish the electrical discharge, and about 20,000 volts were required to sustain this discharge. With this voltage drop, the reason for electrical isolation of the metal fin segments becomes obvious. The fin segment size is chosen so that the combined effects of the standard cathode voltage drop and insulation layer breakdown will not permit the electrical current to pass through the fins and jump the gap between adjacent fin setments. This isolation principle has been used previously in electrical discharge apparatus and is known to those skilled in the art. With the use of segmented fins, the discharge is forced to follow the path of least resistance, which is to pass through the series of aligned holes 20 to complete the circuit from one electrode to the other. The current can be varied in this discharge, but the maximum output power was obtained at a current of 280 milliamps.

Reflector 16 was a ten meter radius of curvature, one inch diameter, copper mirror with approximately 99% reflectivity. Reflector 15 was a flat semi-transparent reflector with a reflectivity of approximately 70% at 10.6 microns. When these reflectors were properly aligned, and oriented so that there was an unobstructed optical path through the series of holes 20 in the fins, laser action was obtained from this structure. The output beam emerged through semi-transparent reflector 15.

The spiral flowing of the laser gas across the electrical discharge tends to blow the electrical discharge toward the upper portion of the holes 20 (for counter-clockwise rotation). This effect is well known to those skilled in the art. The ions in the electrical discharge are simply blown downstream and the discharge bends until the electrical field of the bent discharge can counteract the drag on the ions caused by the gas flow. To bring the electrical discharge path back towards the center of the axis of the holes 20, an external magnetic field was provided through the use of a series of permanent magnets shown as 21 in FIG. 1. It is well known to those skilled in the art that a magnetic field perpendicular to the direction of the current flow exerts a force on an electrical current. Proper choice of the strength and orientation of this transverse magnetic field can be used to counteract the forces responsible for blowing the electrical discharge away from the axis of the holes. With the magnetic field properly established, 710 watts was achieved from this laser structure using the above conditions. Thus, over five times more power was generated than would be expected from a comparable tube-type laser. Likewise, the gas flow rate is approximately 14 times slower than would be expected compared to a standard flow laser.

These factors can be explained when it is considered that the limiting condition on obtaining high power from a carbon dioxide laser is the heat removal from the gas. In this embodiment, however, the gas following the helical path through fin assembly passes through the electrical discharge region where it is excited briefly and lases. After the gas has passed through the discharge region, it continues on the helical path where the heated gas has a considerable time to be cooled down by thermal conduction to the metal fin area. The heat absorbed by the fins 18 in turn, is transferred to the cooling fluid flowing through tube 17. During optimum running conditions, the gas has been cooled by the time that it has made one complete revolution and re-entered the discharge region for a second time. For the conditions described, the gas actually makes 14 complete revolutions in the seven foot length. Since the same gas has passed through the discharge region 14 times, it is possible to get the effect of the flow (convection) laser with only 1/14 the gas flow of a normal flow laser.

While the basic principle of the spiral flow laser has been described above, there are many variations possible in the actual construction of the laser without departing from the basic teachings of this application. For example, FIG. 3 illustrates an alternate method of constructing fin segments 26A. In this case, there is a central core 22, a multiplicity of helical fins 23, and an outer cylindrical area 24. Also holes 25 are drilled through the helical fins. Holes 25 correspond to holes 20 in FIG. 2. This design allows cooling of the fin segments 26A to take place on the outside of cylinder 24 rather than through the center of the helical fins as previously described. In operation, a series of the fin segments shown in FIG. 3 are assembled in an assembly similar to FIG. 1 except that there is no central cooling tube 17. Instead, the outside of tube 10 shown in FIG. 1 is cooled by flowing water or some other suitable heat transfer medium over the outside of tube 10. In operation, the electrical discharge passes through aligned holes 25 and the waste heat is deposited throughout the fin structure shown in FIG. 3. The heat is conducted to outer ring 24 then extracted through conduction to the walls of the outer tube (corresponding to tube 10 in FIG. 1) then to the heat transfer material in contact with this outer tube. Once again, the fin segments 26A shown in FIG. 3 can be made of material such as anodized aluminum to prevent direct metal to metal contact between fin segments.

There are still further variations which are possible whereby some improvement in the heat transfer can be achieved if the individual fin segments are assembled to be vacuum tight while maintaining electrical isolation between the individual fin segments. For example, the fin segments 18 shown in FIG. 2 can be held together with a vacuum tight adhesive or O-rings can be used between fin segments, the cooling fluid can pass through bore 19 in direct contact with the fin material without the additional heat barrier provided by the wall of tube 17. Similarly, fins constructed analogous to those shown in FIG. 3 can be assembled using adhesives or O-rings to make a vacuum tight structure and thereby, eliminate the need for an external tube over the outside of the structure.

The present invention in many respects combines the good features of the discharge tube laser design and the convective flow laser design without the degree of disadvantages experienced by either design in the prior art. The present invention has achieved laser output powers which are more than five times greater than the comparable length discharge tube design. On the other hand, the gas flow rate required to achieve a certain output power can be reduced by at least 14 times compared to the comparable power output convective flow laser constructed according to the prior art. Also, this invention utilizes long, narrow optical cavities so that it is easy to achieve good laser beam quality. The result of these advantages is that this invention has wide application to commercial laser use, since it can use some of the components and construction techniques originally developed for the manufacture of the conventional discharge tube designs.

Thus, there has been shown and described a preferred embodiment of the instant invention. Modifications may be suggested to those skilled in the art. Any such modifications which fall within the purview of this description are intended to be included herein as well. The descriptions are not intended to be limitative. Rather, the scope of the invention is defined by the claims appended hereto.

Having thus described a preferred embodiment of the invention, what is claimed is:

1. In a gas laser including means for supplying a lasing gas and means for producing an electrical discharge through said gas, the improvement comprising spiral fin assembly means for directing said gas in a spiral path, said spiral fin assembly means including at least one aperture in each fin through which said electrical discharge passes.

2. The laser recited in claim 1 wherein,
said spiral fin assembly includes a central support member, and
at least one fin structure attached to and supported by said central support member to define a spiral path around said central support member.

3. The laser recited in claim 2, wherein,
said central support member is hollow such that a cooling fluid can be passed therethrough.

4. The laser recited in claim 2 wherein,
said central support member is solid, and
an outer housing substantially concentric to and spaced from said central support member and connected to the outer ends of said fin structure.

5. The laser recited in claim 1 wherein,
said spiral fin assembly includes a plurality of individual segments which are electrically isolated from each other.

6. The laser recited in claim 1 including,
magnetic means disposed adjacent to said spiral fin assembly to control the path of said electrical discharge.

7. The laser recited in claim 1 including,
external casing means surrounding said spiral fin assembly to confine said gas.

8. In a gas laser including means for supplying a lasing gas and means for producing an electrical discharge through said gas, the improvement comprising fin assembly means for directing said gas in a predetermined path, said fin assembly means including at least one aperture in each fin of said fin assembly means through which said electrical discharge passes.

* * * * *